United States Patent [19]

Kennedy et al.

[11] Patent Number: 5,012,251
[45] Date of Patent: Apr. 30, 1991

[54] RADAR CAPABILITY DISPLAY APPARATUS

[75] Inventors: Peter D. Kennedy, Mesa; Wayne M. Blasi, Phoenix, both of Ariz.

[73] Assignee: The United States of America as represented by the Secretary of the Air Force, Washington, D.C.

[21] Appl. No.: 533,239

[22] Filed: May 31, 1990

[51] Int. Cl.$^5$ .......................... G01S 7/04; G01S 7/22; G01S 7/40

[52] U.S. Cl. ..................................... 342/176; 342/93; 342/182; 342/173

[58] Field of Search .................. 342/176, 182, 93, 173

[56] References Cited

U.S. PATENT DOCUMENTS

| | | | |
|---|---|---|---|
| 3,171,124 | 2/1965 | Dilks et al. | 342/173 |
| 3,268,891 | 8/1966 | Atlas | 342/26 |
| 3,680,106 | 7/1972 | Foley | 342/173 |
| 3,829,858 | 8/1974 | Bergkvist | 342/93 X |
| 4,053,890 | 10/1977 | Woodson, III et al. | 342/172 |
| 4,319,247 | 3/1982 | Warren | 342/171 |
| 4,499,469 | 2/1985 | Kesterson | 342/172 |
| 4,529,983 | 7/1985 | Lyall | 342/26 |
| 4,723,124 | 2/1988 | Boles | 342/25 |

Primary Examiner—Gilberto Barron, Jr.
Attorney, Agent, or Firm—William Stephanishen; Donald J. Singer

[57] ABSTRACT

A radar capability display apparatus utilizing radar theory equations which are stored in a computer to relate the measured characteristics of interference signals in radar return echoes to determine the amount of radar performance degradation that the interference signals create. These loss of performance factors which are obtained at each antenna beam angle and range, are displayed on the radar's screen as the radar capability display.

9 Claims, 1 Drawing Sheet

RADAR CAPABILITY DISPLAY APPARATUS

STATEMENT OF GOVERNMENT INTEREST

The invention described herein may be manufactured and used by or for he Government for governmental purposes without the payment of any royalty thereon.

BACKGROUND OF THE INVENTION

The present invention relates broadly to a surveillance radar apparatus, and in particular to a radar capability display apparatus.

The state of the art of radar display apparatus is well represented and alleviated to some degree by the prior art apparatus and approaches which are contained in the following U.S. Patents:

U.S. Pat. No. 4,053,890 issued to Woodson et al on 11 October 1977;

U.S. Pat. No. 4,319,247 issued to Warren on 9 March 1982;

U.S. Pat. No. 4,499,469 issued to Kesterson on 12 February 1985; and

U.S. Pat. No. 4,723,124 issued to Boles on 2 February 1988.

The Woodson et al patent describes an internal calibration system utilizing a pulse-generation means which produces RF pulses that are injected into the radar receiver. A range control means and an attenuation control means selectively vary the range and the signal strength of the RF pulses in either a manual or an automatic sequence. A display and evaluation means determines the signal strength at which a radar tracking lock is established and compares that signal strength with a standard to provide a indication of receiver operability.

The Warren patent is directed to a testing device for simulating targets at different ranges. The testing device includes a small aerial arranged to sample a transmitted pulse. This sample is fed to a circuit which imposes successive delays on the sample and feeds its back to the aerial at successive different times.

The successive delays are produced by a delay line and a feed-back loop containing an amplifier. The circuit also includes a frequency shifter which simulates a Doppler shift.

The Kesterson patent discloses a radar system testing apparatus wherein a signal from the radar representing the elevation position of the antenna is inputted to an analog comparator circuit for determining when the antenna position is within an adjustable specification window, thereby causing the invention to generate a simulated target echo of variable range when the invention receives the proper triggering signal.

The Boles patent discusses a synthetic aperture radar apparatus which includes the method and apparatus for ship classification by providing real-time high resolution synthetic aperture radar imagery of a translating ship under the influence of rotational motions from sea state conditions.

In a typical surveillance radar, the signal strength of the echo from a given reflecting object is a function of the transmitter power, antenna size, atmospheric properties, size of the reflecting object, distance (range) to the reflecting object, and other variables. Whether this signal can be detected and will provide a certain indication that the object is truly present at the location that is determined from the time delay of the echo and the direction of the antenna beam when the echo is observed, depends on the relative power level of the signal and the power level of the interference. Typically, the echo signal needs to be ten to one hundred times more powerful (depending on various parameters of the radar operation) than the interference for reliable detection to occur. The signal from a given type of target gets weaker as the range increases, so the power level of the interference determines the maximum range at which a target of that type can be reliably detected.

Many radars do, in fact, measure the power level of the interference in their receivers for the purpose of setting a threshold with which the received signal for each range is compared to determine whether a target should be declared to be present at that range. This tends to keep the false alarm rate of the system at a constant value as the interference changes, so the operation is referred to as constant false alarm rate, or CFAR, detection. For purposes of a radar capability display, the constant false alarm rate threshold would be measured quantitatively, and equations from radar theory would be evaluated to determine whether a target of the specified type could be detected at certain ranges. The maximum range determined thereby is plotted on the radar capability display.

While the above-cited references are instructive, there still remains a need to provide a radar that could measure the power level of the interference in its receiver, then it could compute and plot the maximum range at which a target of the specified type could be reliably detected. The effects of signal attenuation due to rain and/or pulsed interference will also be accounted for. The present invention is intended to satisfy that need.

SUMMARY OF THE INVENTION

The present invention utilizes a computer to analyze signals received by the radar to make specific measurements of environmental and other interferences in its field of scan. The received signals can be analyzed in certain ways from measurements that are not ordinarily utilized in radars, and the nature of the interference can be deduced from the effects that are observed by these measurements.

These measurements are assumed to be quantitative. That is, the power level, bandwidth, and other characteristics of the interference signals are measured in microwatts, megahertz, and other appropriate units. Since the theory of radar provides equations for relating these quantities to the characteristics of the causes of the signals, such as rainfall intensity, jammer power, etc., the radar equipment can compute these characteristics for the sources of interference that are observed in different directions around the radar.

Since theory of radar also provides equations for relating these characteristics of the interference to the degradation of radar performance that the interference causes, the radar and the computer associated with it, can estimate the range at which a given type of target can be detected as a function of the direction around the radar. The display of this information in a form that enables the radar operator to quickly understand the current conditions, is the radar capability display.

It is one object of the present invention, therefore, to provide an improved radar capability display apparatus that recognizes and measures environmental conditions that would degrade radar performance.

It is another object of the invention to provide an improved radar capability display apparatus that utilizes and analyzes received radar signal returns to determine the source and type of interference encountered.

It is still another object of the invention to provide an improved radar capability display apparatus that utilizes the radar equations to compute the characteristics of the interference and provide an estimate of the range that a given type of target can be detected, as a function of direction.

It is yet another object of the invention to provide an improved radar capability display apparatus wherein the signal strength of the echo from a given reflecting object is measured and related to the transmitter power, antenna size, atmospheric properties, size of the reflecting object, distance (range) to the reflecting object, and other variables.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
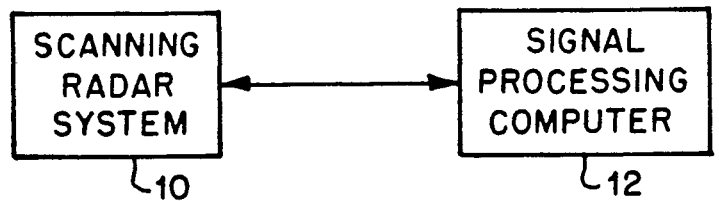
FIG. 1 is a block diagram of the radar capability display apparatus according to the present invention.

Referring now to FIG. 1, there is shown a block diagram of the radar capability display apparatus utilizing a scanning radar system 10 to receive radar return signals. The scanning radar system 10 may comprise any type of tactical air search radar having advanced features such as electronic beam steering, multi-mode digital signal processing, and frequency-agile microwave operation.

The scanning radar system 10 provides measured received signal characteristics, such as power level, bandwidth, duration, etc. to the signal processing computer 12. The signal processing computer 12 has stored therein programs derived from the theory of radar equations. The received echo return signals can be analyzed for specific characteristics which result from measurements of the interference. The nature of the interference can be determined from the characteristics that are obtained by these interference signal measurements and correlation thereof with the radar theory equations.

The interference measurements are assumed to be quantitative. That is, the power level, bandwidth, and other characteristics of the interference signals are measured in microwatts, megahertz, and other appropriate units. Since the theory of radar provides equations for relating these quantities to the characteristics of the causes of interference return signals, such as rainfall intensity, jammer power, etc., the radar equipment can compute these characteristics for the sources of interference that are observed in different directions around the radar.

The theory of radar also provides equations for relating these characteristics of the return interference signals to the degradation of radar performance that the interference causes. The radar and the computer associated with it, can estimate the range at which a given type of target can be detected as a function of the direction around the radar. The display of this information which is in a form that enables the radar operator to quickly understand the current conditions is the radar capability display.

The radar capability display apparatus operates and functions in the following manner. In order to develop a full radar capability display, the radar return echoes are analyzed to provide an assessment of the environment; that is, a determination of all circumstances in the environment that might degrade the radar's performance. For all purposes of the present discussion, this does not, however, include maintenance problems such as loss of transmitter efficiency that would be expected to be detected by built-in-test-equipment and to be corrected by maintenance personnel. In this discussion, the radar equipment and adjunct equipment will be assumed to be operating exactly in accordance with their specifications. This determination will be made on the basis of the radar's own measurements, which will include the following elements:

CFAR average (or threshold) as generated by the radar's range-cell-averaged constant false alarm rate (CFAR) target detection process Opposite-sense and same-sense reflections as observed with circularly polarized antenna operation Fraction of range cells blanked by the side lobe blanker These radar measurements will be analyzed to recognize environmental effects such as rain clutter and random pulse jammers.

The assessment of the environment stage is responsible for determining the natural and man-made interference in the environment and the parameters associated with them that are necessary to calculate their effect on the radar's capability.

In order to properly assess the interference sources in the radar's field of search, all of the measurements of the radar environment that are made by the radar will be available for analyzing the radar's performance at each beam angle, range, and time. Some of the environmental parameters could be derived from the normal operation of the system, while others may require some deviation from its standard operation, for example, a momentary switch to circularly polarized antenna operation. The relevant measurements of the radar environment are outlined below.

1. CFAR Average

In the normal mode of radar operation, the signal processor detects targets by comparing each range cell's processed signal (that is, the result of whatever integration and Doppler spectrum filtering is applied) with the average of the equivalent signals from a group of range cells that surrounds the cell being tested. In effect, the CFAR (Constant False Alarm Rate) function generates a threshold that is controlled by the spurious inputs (principally receiver, noise, ground clutter residue, rain clutter, and jammer noise) that might otherwise interfere with the target detection process by generating an excessive number of false alarms. The CFAR average, which is calibrated in terms of some appropriate unit of power, is applied to the radar capability computer. It represents this background noise level that will determine the signal power required for target detection.

2. Opposite-Sense Circular Polarization

The transmitting function of the antenna may utilize controllable polarization, and the receiving function is required to provide two independent channels, each with independently controllable polarization. When a circularly polarized signal is transmitted, echoes from natural rain will exhibit a high ratio of the opposite-sense circularly polarized component to the same-sense component. Furthermore, the power of the signal reflected by the rain is related to the rainfall rate and to the radar system parameters mentioned earlier, which enables the rainfall rate to be estimated for each range cell by the radar capability computer.

3. Fraction of Cells Blanked

The radar system may also include a conventional sidelobe blanking arrangement consisting of an auxiliary wide beam antenna, an auxiliary receiver, and a controllable video signal inhibitor. The last may include a means for substituting an estimated signal for each one that is deleted by blanking so that the remaining signals in the dwell can be processed. The fraction of range cells that is blanked in each beam dwell will be evaluated for use in the radar capability calculation.

The present apparatus utilizes the theory of radar equations to determine the characteristics of the interference which causes degradation of radar performance. The radar and the computer associated with it then estimate the range at which a given type of target can be detected as a function of the direction around the radar. The display of this information in a form that enables the radar operator to quickly understand the current conditions is the radar capability display. Briefly, its purpose is to display the detection range for a target with specified characteristics as a function of the beam angle with the observed environmental factors being taken into account. If the capability display were to show the detection ranges for the nominal target at beam positions around the horizon for an interference-free environment, the display would present a circular contour with its radius being equal to the nominal detection range (assuming that the radar parameters had indeed been adjusted to produce this result). The range portrayed by the display will have been computed from the CFAR threshold developed by the radar circuitry by applying the principles explained in the following paragraphs. The computations would have also accounted for various electronic countermeasures that might be applied, such as side lobe cancellation, circular polarization, Doppler spectrum filtering, and increased dwell time.

Radar target detection theory shows that the power of the signal reflected from a given reflecting object must exceed some multiple of the background power before the signal can be reliably detected; that is, before a target can be declared, with a certain probability of success and with a certain degree of confidence that each apparent detection is not a "false alarm", to be present at that particular point. Typically, the required ratio of target signal to background power will be in the range of ten to one-hundred, depending on the desired reliability of the system, with higher values being required for higher probabilities of detection and reduced false alarm rates. Consequently, when the required ratio is determined from the probability of detection and false alarm rate specified by the radar user, the minimum signal power required for target detection can be found by multiplying this ratio by the power indicated by the CFAR average signal.

The power received by a radar from a reflecting object depends on the following factors: transmitter peak power, pulse compression ratio, antenna gain, integration gain (which is related to the number of signal samples that are integrated in the target detection process), radar equipment losses, atmospheric losses, target size, and target range (or distance from the radar to the reflecting object). Consequently, if the minimum signal power required for target detection is known (from the process outlined just above), all the radar system and atmospheric parameters are known (or can be estimated), and the size of a relevant target is specified, then the range at which the minimum signal power required for target detection will be obtained can be computed.

When some type of interference appears, the interfering signals will raise the CFAR detection threshold and the estimated detection range will be reduced accordingly. The interfering signals might include the residue of Doppler spectrum filtering of ground and rain clutter as well as jammer inputs.

Figure 2:
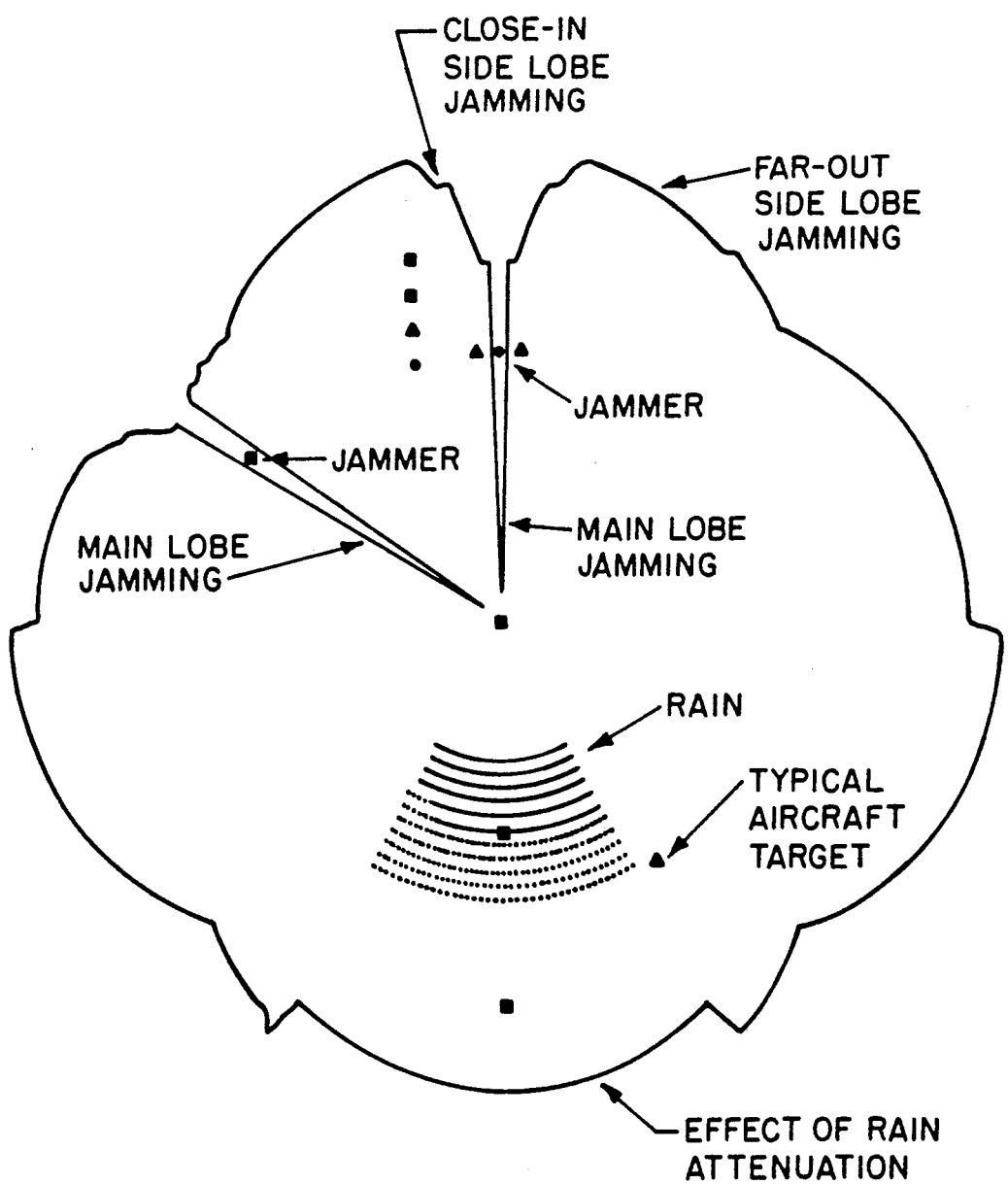
FIG. 2 is a graphical representation of an example of a radar capability display.

Turning now to FIG. 2, there is shown a graphical representation of an example of a detection contour for a situation involving two CW noise jammers carried by aircraft in the upper part of the display. The hypothetical radar includes four electronically steered planar antennas that are oriented toward the north, east, south and west, respectively. This illustration is based on a pen plot of the computer-generated information for the assumed situation; capability plots are more typically observed on the radar system CRT monitor that is driven by commands which are generated in the signal processing computer. Furthermore, for this particular example, the transmitter power was assumed to be constant at all beam positions, so the effects of antenna gain reduction for off-axis beam angles are apparent. As noted on the illustration, the jammers reduce the detection range to quite small values when the antenna beam is aimed directly toward them. The loss of detection range is less in the close-in side lobe regions of the antenna and even less in the far-out side lobe regions with lower antenna sensitivity. In general, the effects of several jammers are additive at beam angles at which they all inject noise into the system through antenna side lobes.

The illustration also includes an area in which rain reflections have been detected as such by the measurement of opposite-sense circularly polarized signals. When an area of this type is viewed on a cathode ray tube (CRT) screen, its color will show whether or not the magnitude of the rain reflection in each region of the storm will allow detection of the nominal target. The related computations will take into account the assumed reduction of the rain reflection by circular polarization and/or Doppler spectrum filtering.

The presence of rainfall along the path of the radar signal through the atmosphere can reduce the radar capability markedly by increasing the atmospheric losses (or signal attenuation). When rain reflections are recognized, this effect can be accounted for by estimating the attenuation that the rain causes and including this attenuation in the computation. Since the excess attenuation caused by the rain is related to the rainfall rate, which is computed from the measured rain reflections, these measurements enable the rain attenuation to be computed and taken into account in the computation of the range at which the signal power required for target detection would be obtained (if a target of the specified size were present). The illustration in FIG. 2 of a hypothetical capability situation shows an area of detected rain and the resulting reduction of detection range in directions for which the signals pass through the rain area.

Another effect can occur when an interference source introduces short pulses of a strong signal into the radar receiver. The side lobe blanker system will prevent false target detections, but the radar will be unable to detect targets during each of these pulses and this will affect the general probability of target detection. For example, if the interference pulses collectively occupy 0.1 of the available reception time, then the probability of detecting even very strong target signals will be reduced to 0.9 (1.0—0.1=0.9). As another example, if the probability of detection for signals of some weaker level is 0.8 in the absence of interference pulses, then pulsed interference with 0.1 duty cycle will reduce the probability of detection at this signal level to $0.9 \times 0.8 = 0.72$. If the required detection probability for the specified target were 0.8, then a stronger signal would be required; specifically, the signal level that would make the detection probability in the absence of interference pulses be 0.889 (because $0.9 \times 0.889 = 0.8$). To generate this stronger signal, the specified target would have to be closer to the radar than before. Consequently, the pulsed interference has reduced the target detection range of the radar in a way that depends on the duty cycle of the interference.

The Radar Capability Computer accounts for this capability reduction by (1) observing the duty cycle of pulsed interference when it is present (the fraction of range cells blanked by the side lobe blanker is one of the inputs from the radar's signal processor to the Radar Capability Computer), (2) computing the increase in target signal power that is necessary to maintain the specified detection probability for targets, and (3) using this increased signal power required for target detection in the computation of the range at which the specified target can be detected.

Although the invention has been described with reference to a particular embodiment, it will be understood to those skilled in the art that the invention is capable of a variety of alternative embodiments within the spirit and scope of the appended claims.

What is claimed is:

1. A radar capability display apparatus comprising in combination:
    a scanning radar system transmitting search beams in a surveillance region, said scanning radar system receiving return echoes for each beam angle, range and time, said scanning radar system quantitatively measuring the characteristics of said return echoes, said scanning radar system includes a sidelobe blanking arrangement which utilizes an auxiliary wide beam antenna, an auxiliary receiver, and a controllable video signal inhibitor, said video signal inhibitor including a means for substituting an estimated signal for each echo signal that is deleted by blanking so that the remaining signals in the dwell can be processed and then indicating the fraction of range cells that is blanked in each beam dwell and,
    a signal processing computer operatively connected to said scanning radar system to receive and process the characteristics of said return echoes for each beam angle, range and time, said signal processing computer having stored therein programs derived from radar theory equations, said signal processing computer processing and relating said radar theory equations with the characteristics of said return echoes to determine the nature of the interference signal, said signal processing computer processing said interference signal to determine the degree of degradation of said radar system performance, said signal processing computer providing to said radar system a capability signal which establishes the range at which a given type of target can be detected as a function of beam angle around said radar system, said signal processing computer providing a capability signal for each beam angle and thereby providing a radar capability display which depicts the range at which a specified type of target can be detected in each direction within said surveillance region.

2. A radar capability display apparatus as described in claim 1 wherein said surveillance region comprises a full 360°.

3. A radar capability display apparatus as described in claim 1 wherein said surveillance region comprises a predetermined sector.

4. A radar capability display apparatus as described in claim 1 wherein said fraction of blanked range cells is used by said signal processing computer to estimate the increased minimum signal power required for target detection, said increased minimum signal power which is required for target detection is employed in computing the range at which a target of the specified type can be detected.

5. A radar capability display apparatus as described in claim 1 wherein said scanning radar system includes constant false alarm rate detection circuit which provides a CFAR threshold, said CFAR threshold would be measured quantitatively, and said radar theory equations would be evaluated to determine whether a target of the specified type could be detected at certain ranges, the maximum range determined thereby is plotted on said radar capability display.

6. A radar capability display apparatus as described in claim 1 wherein said characteristics of said return echoes includes the power level and bandwidth of said interference signals which are measured in quantitative units, respectively.

7. A radar capability display apparatus as described in claim 1 wherein said scanning radar system includes a momentary switch to circularly polarize antenna operation.

8. A radar capability display apparatus as described in claim 1 wherein said scanning radar system includes a transmitting antenna which has a controllable polarization, and the receiving function is assumed to provide two independent channels, each with independently and arbitrarily controllable polarization, when a circularly polarized signal is transmitted, echoes from natural rain will exhibit a high ratio of the opposite-sense circularly polarized component to the same-sense component.

9. A radar capability display apparatus as described in claim 1 wherein said scanning radar system detects and measures rainfall intensity at a point in said surveillance region, said rainfall intensity is estimated from the observed signal power of the rain reflections, the excess attenuation due to the rainfall is estimated, and the excess attenuation due to the rain is included in computing the range at which a target of the specified type can be detected.

* * * * *